US010821987B2

(12) United States Patent
McBride (10) Patent No.: US 10,821,987 B2
(45) Date of Patent: Nov. 3, 2020

(54) VEHICLE INTERIOR AND EXTERIOR MONITORING

(71) Applicant: Ford Global Technologies, LLC, Dearborn, MI (US)

(72) Inventor: James Robert McBride, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 493 days.

(21) Appl. No.: 15/214,700

(22) Filed: Jul. 20, 2016

(65) Prior Publication Data

US 2018/0022356 A1 Jan. 25, 2018

(51) Int. Cl.
| | |
|---|---|
| *B60W 40/08* | (2012.01) |
| *G01S 17/86* | (2020.01) |
| *G01S 17/931* | (2020.01) |
| *B60Q 9/00* | (2006.01) |
| *G01S 17/42* | (2006.01) |
| *G01S 17/89* | (2020.01) |
| *G05D 1/02* | (2020.01) |
| *G06K 9/00* | (2006.01) |

(52) U.S. Cl.
CPC ............... *B60W 40/08* (2013.01); *B60Q 9/00* (2013.01); *G01S 17/42* (2013.01); *G01S 17/86* (2020.01); *G01S 17/89* (2013.01); *G01S 17/931* (2020.01); *G05D 1/0231* (2013.01); *G06K 9/00845* (2013.01); *B60W 2040/0881* (2013.01); *B60W 2420/52* (2013.01)

(58) Field of Classification Search
CPC ............. B60W 30/09; B60W 30/0956; B60W 30/0953; B60W 30/08; B60W 2420/52; B60Q 9/008; B60Q 5/006; B60T 2201/024; G05D 1/0212; G08G 1/166
See application file for complete search history.

(56) References Cited

U.S. PATENT DOCUMENTS

| | | | |
|---|---|---|---|
| 6,049,747 A | 4/2000 | Nakajima et al. | |
| 7,330,124 B2 | 2/2008 | Ota | |
| 8,874,301 B1 | 10/2014 | Rao et al. | |
| 9,117,358 B2 | 8/2015 | Levin et al. | |
| 9,517,767 B1* | 12/2016 | Kentley | B60R 21/01 |
| 2007/0229661 A1 | 10/2007 | Aoki et al. | |
| 2008/0046150 A1* | 2/2008 | Breed | B60R 21/0134 |
| | | | 701/45 |
| 2013/0314503 A1* | 11/2013 | Nix | G06K 9/00805 |
| | | | 348/46 |
| 2014/0309884 A1* | 10/2014 | Wolf | B60T 8/17 |
| | | | 701/41 |
| 2015/0266489 A1* | 9/2015 | Solyom | B60W 50/029 |
| | | | 701/23 |
| 2017/0066449 A1* | 3/2017 | Lee | B60G 17/019 |
| 2017/0115387 A1* | 4/2017 | Luders | G01S 17/026 |
| 2017/0120904 A1* | 5/2017 | Kentley | G01C 21/32 |
| 2017/0269599 A1* | 9/2017 | Ansari | G05D 1/0212 |
| 2017/0329337 A1* | 11/2017 | Kusano | G08G 1/0965 |

(Continued)

*Primary Examiner* — Mirza F Alam
(74) *Attorney, Agent, or Firm* — Frank A. MacKenzie; Bejin Bieneman PLC (57) ABSTRACT

A LIDAR sensor is mountable to a vehicle exterior with a field of view including a vehicle interior view first portion and a vehicle exterior view first portion. Data can be received from the LIDAR sensor. A state of a vehicle occupant can be determined based at least in part on data from the LIDAR sensor.

14 Claims, 6 Drawing Sheets

(56) References Cited

U.S. PATENT DOCUMENTS

2017/0355314 A1* 12/2017 May .......................... B60R 1/12
2018/0129204 A1* 5/2018 Ricci ................... B60R 25/2018
2019/0138002 A1* 5/2019 Mimura ................ B60W 10/20

* cited by examiner

100 for interior and exterior monitoring of a vehicle 105.

VEHICLE INTERIOR AND EXTERIOR MONITORING

BACKGROUND

Various mechanisms can be used to monitor a vehicle's interior and/or the state of vehicle occupants. To name one example, cameras may be included in a vehicle interior to provide images that can be analyzed to determine whether occupants are present, and provide a state of the occupants. In another example, weight sensors in vehicle seats can be used to determine an occupant's presence, and possible characteristic such as an occupant's size and/or weight, which can be relevant to a vehicle safety system. However, these and other sensors can suffer from various deficiencies. For example, only limited information may be available. Further, such sensors may be dedicated to vehicle interior monitoring but not used for other purposes.

DETAILED DESCRIPTION

Figure 1:
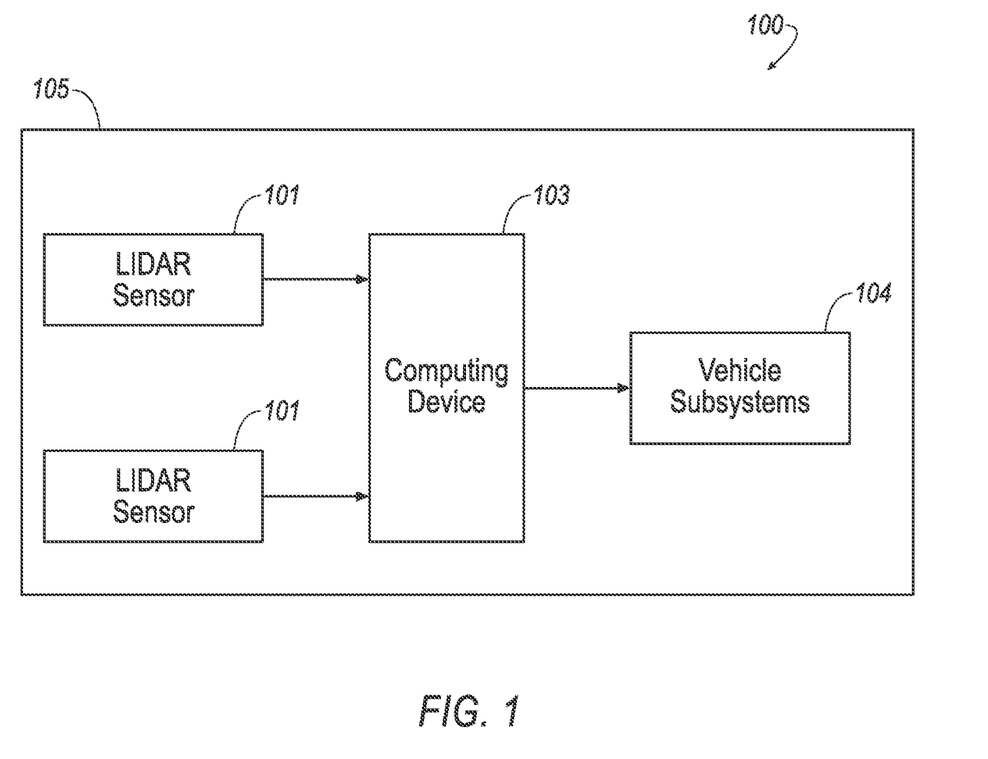
FIG. 1 is block diagram of an exemplary system for determining a vehicle occupant state.

FIG. 1 is a block diagram of an exemplary vehicle system 100 for interior and exterior monitoring of a vehicle 105. The system 100 may include one or more Light Detection And Ranging (LIDAR) sensors 101 mountable at an exterior location of the vehicle 105. A LIDAR sensor can be arranged to have a field of view that includes interior and exterior portions of the vehicle 105. Further, a sensor 101 is communicatively coupled with a vehicle 105 computing device 103. For example, a sensor 101 can provide data concerning a vehicle interior to the vehicle 105 computing device 103. The computing device 103 can then determine, according to such data, a presence and/or state of one or more vehicle occupants. At the same time, the sensor 101 can provide data concerning a vehicle exterior to the computing device 103, which can use such data for various purposes, e.g., collision detection and avoidance, automatic cruise control, etc.

Exemplary System Elements

The vehicle 105 is typically a land vehicle with at least three wheels and a cabin or the like including an interior. The vehicle 105 may be powered in variety of known ways, e.g., with an electric motor and/or internal combustion engine.

The computing device 103 includes a processor and a memory such as are known. The memory includes one or more forms of computer-readable media, and stores instructions executable by the processor for performing various operations, including as disclosed herein. For example, the computing device 103 may include programming to operate one or more of vehicle 105 brakes, propulsion (e.g., control of acceleration in the vehicle 105 by controlling one or more of an internal combustion engine, electric motor, hybrid engine, etc.), steering, climate control, interior and/or exterior lights, etc., as well as to determine whether and when the computing device 103, as opposed to a human operator, is to control such operations.

The computing device 103 may include or be communicatively coupled to, e.g., via a vehicle communications bus as described further below, more than one computing devices, e.g., controllers or the like (sometimes known as electronic control units, or ECUs) included in the vehicle 105 for monitoring and/or controlling various vehicle 105 components, e.g., a powertrain controller, a brake controller, a steering controller, etc. The computing device 103 is generally arranged for communications on a vehicle communication network such as a bus in the vehicle 105 such as a controller area network (CAN) or the like, and/or other wired or wireless communication mechanisms such as are known, e.g., Ethernet or other communication protocols.

Figure 2A:
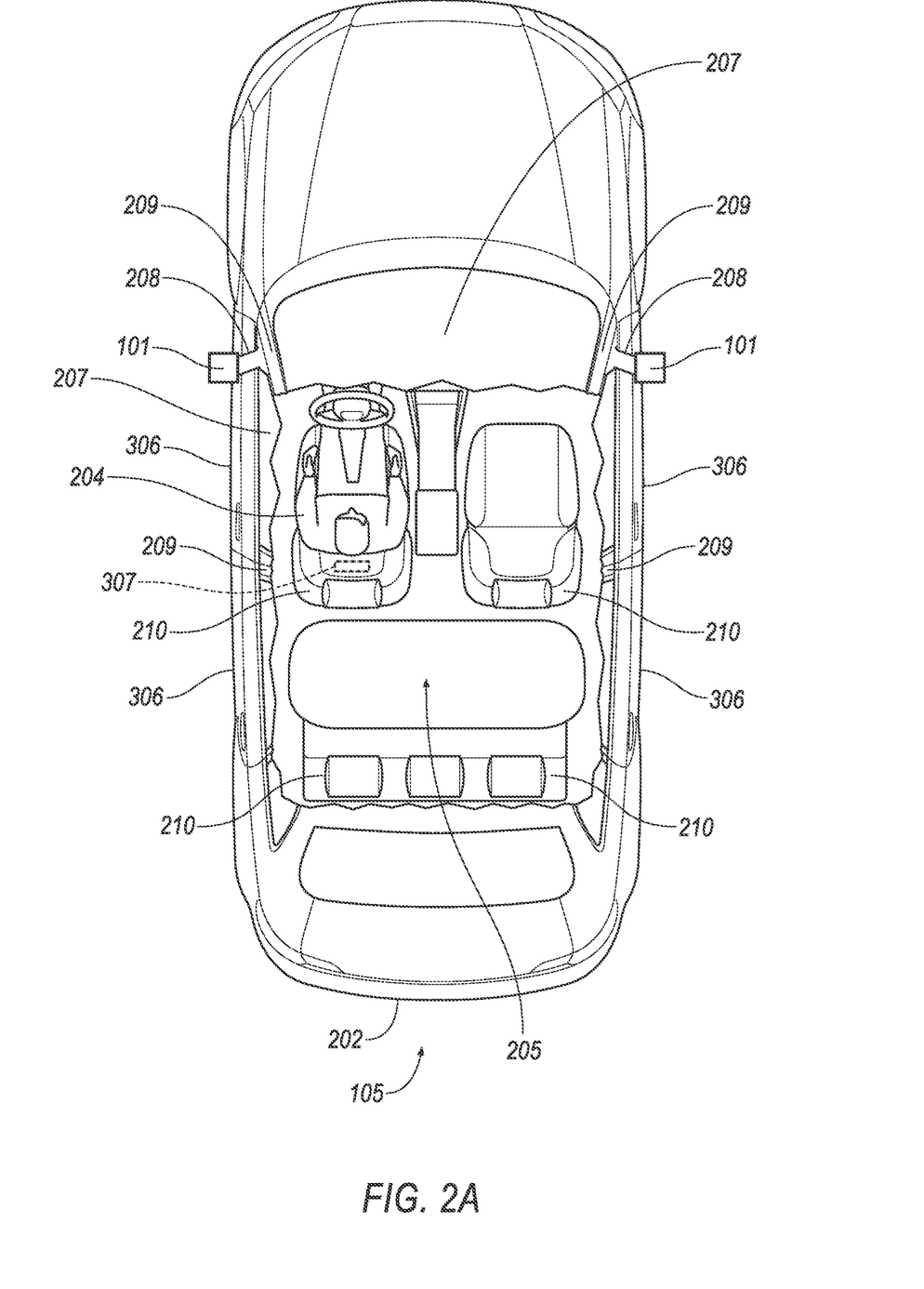
FIG. 2A is a top view of the vehicle of FIG. 1.

Via the vehicle network, the computing device 103 may transmit messages to various devices in the vehicle 105 and/or receive messages from various devices, e.g., controllers, vehicle subsystems including actuators, sensors (including one or more LIDAR sensors 101), etc. Alternatively or additionally, in cases where the computing device 103 comprises multiple devices, as is possible, the vehicle communication network may be used for communications between devices represented as the computing device 103 in this disclosure. Further, as mentioned below, various controllers or sensing elements may provide data to the computing device 103 via the vehicle communication network, and the computing device 103 may send messages to subsystems 104. As discussed further below with respect to FIG. 2, subsystems 104 can include vehicle 105 components that may be actuated according to sensor 101 data, and in any case generally include, among other components, braking, steering, propulsion subsystems 104.

As already mentioned, generally included in instructions stored in the memory and executed by the processor of the computing device 103 is programming for operating one or more vehicle 105 subsystems 104, e.g., braking, steering, propulsion, etc., without intervention of a human operator. Controllers, as that term is used herein, are computing devices that typically are programmed to control a specific vehicle subsystem. Examples include a powertrain controller a brake controller, and a steering controller. A controller may be an electronic control unit (ECU) such as is known, possibly including additional programming as described herein. The controllers may communicatively be connected to and receive instructions from the computing device 103 to actuate a subsystem according to the instructions. For example, the brake controller may receive instructions from the computing device 103 to operate the vehicle 105 brakes.

A LIDAR sensor 101, as is known, may include a light transmitter and a light receiver. The light transmitter radiates laser light, or a beam of light in other spectral regions like Near Infrared, e.g., a light beam with a wavelength at 950 nm. Wavelengths transmitted by the light transmitter may vary to suit the application. For example, Mid Infrared light beams are advantageous for automotive applications to increase detection range and/or resolution. The light receiver receives reflected light, i.e., the reflection of the transmitted radiation to image objects and surfaces. Typically, a LIDAR sensor 101 can provide data for mapping physical features of sensed objects with a very high resolution, and can target a wide range of materials, including non-metallic objects, rocks, rain drops, chemical compounds, etc.

Figure 3:
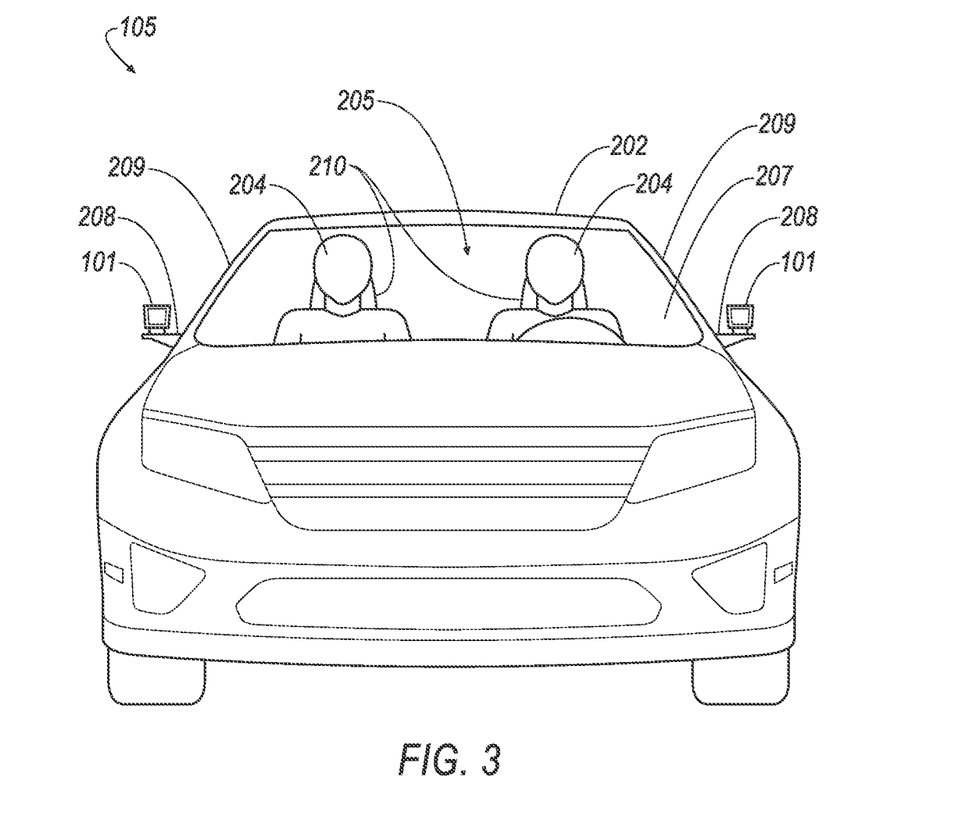
FIG. 3 is a perspective view of a vehicle including the system of FIG. 1.
Figure 4:
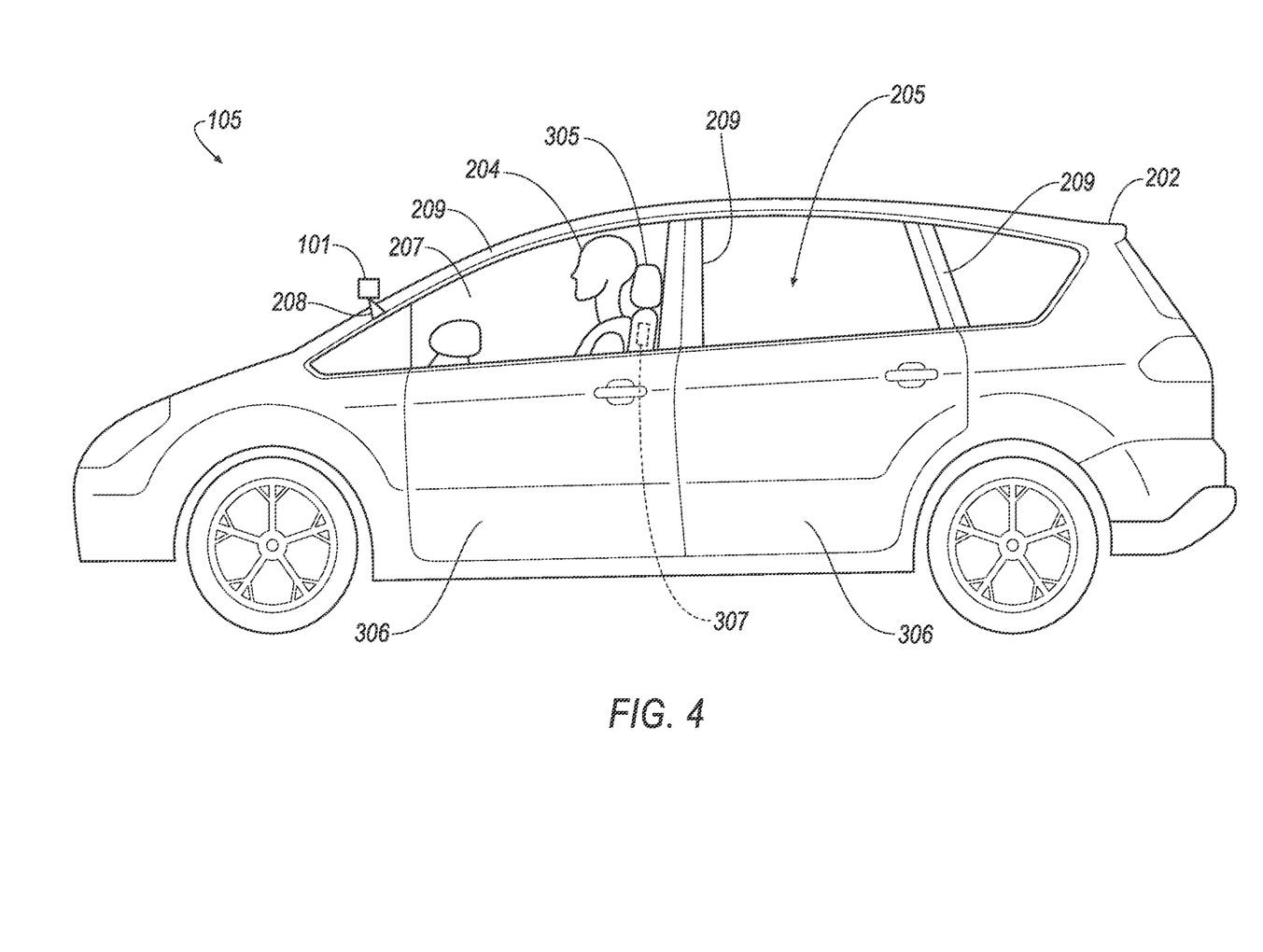
FIG. 4 is a side view of another exemplary vehicle including a LIDAR sensor mounted to a pillar.

Turning to FIG. 2A, and also with reference to FIGS. 3 and 4, the vehicle body 202 includes the vehicle cabin interior 205 and a vehicle body 202 that defines a vehicle 105 exterior, i.e., any item located on or beyond a surface of the body 202 is within the vehicle 105 exterior. One or more occupants 204 can be positioned, e.g., seated, in the vehicle interior 205. The vehicle body 202 may include one or more windows 207, e.g., a front window 207, as well as exterior side mirrors 208, and pillars 209 such as are known. The vehicle 105 may include the computing device 103, one or more LIDAR sensor(s) 101, the sensors 101 being mounted at one or more locations on the vehicle body 202 (for purposes of this disclosure extensions from the vehicle body 106 such as mirrors 208 are included in the definition of "vehicle body"). Further, a LIDAR sensor 101 can be mounted to a vehicle 105 exterior and positioned to obtain data from a vehicle 105 interior 205, as well as the vehicle 105 exterior. For example, the sensor 105 is typically positioned to obtain data through a vehicle 105 window 207.

Moreover, as is known, when transmitted radiation from a LIDAR sensor 101 is directed to a transparent or semi-transparent object, e.g., a vehicle window 207, the transmitted radiation may be partially reflected by the object, and may also partially penetrate the object. The partially penetrated radiation may generate a second reflection on another surface behind the transparent object, e.g., an occupant 204 in the vehicle interior 205. Such a second reflection may provide LIDAR data for creating a 3D map, i.e., a scaled representation such as is known from LIDAR data, of objects inside the vehicle interior 205, including one or more occupants.

LIDAR sensor 101 may be mounted to various locations on a vehicle 105 exterior. Example locations include a vehicle 105 door 306, e.g., secured to an exterior side mirror holder 208 extending from a door 306, and/or mounted to a pillar 209. Yet further alternatively or additionally, a LIDAR sensor 101 may be mounted anywhere on the vehicle exterior with a field of view 301 encompassing at least partially the vehicle exterior and at least partially the vehicle interior 205, e.g., to the fenders, the hood and/or engine mount, etc.

Figure 2B:
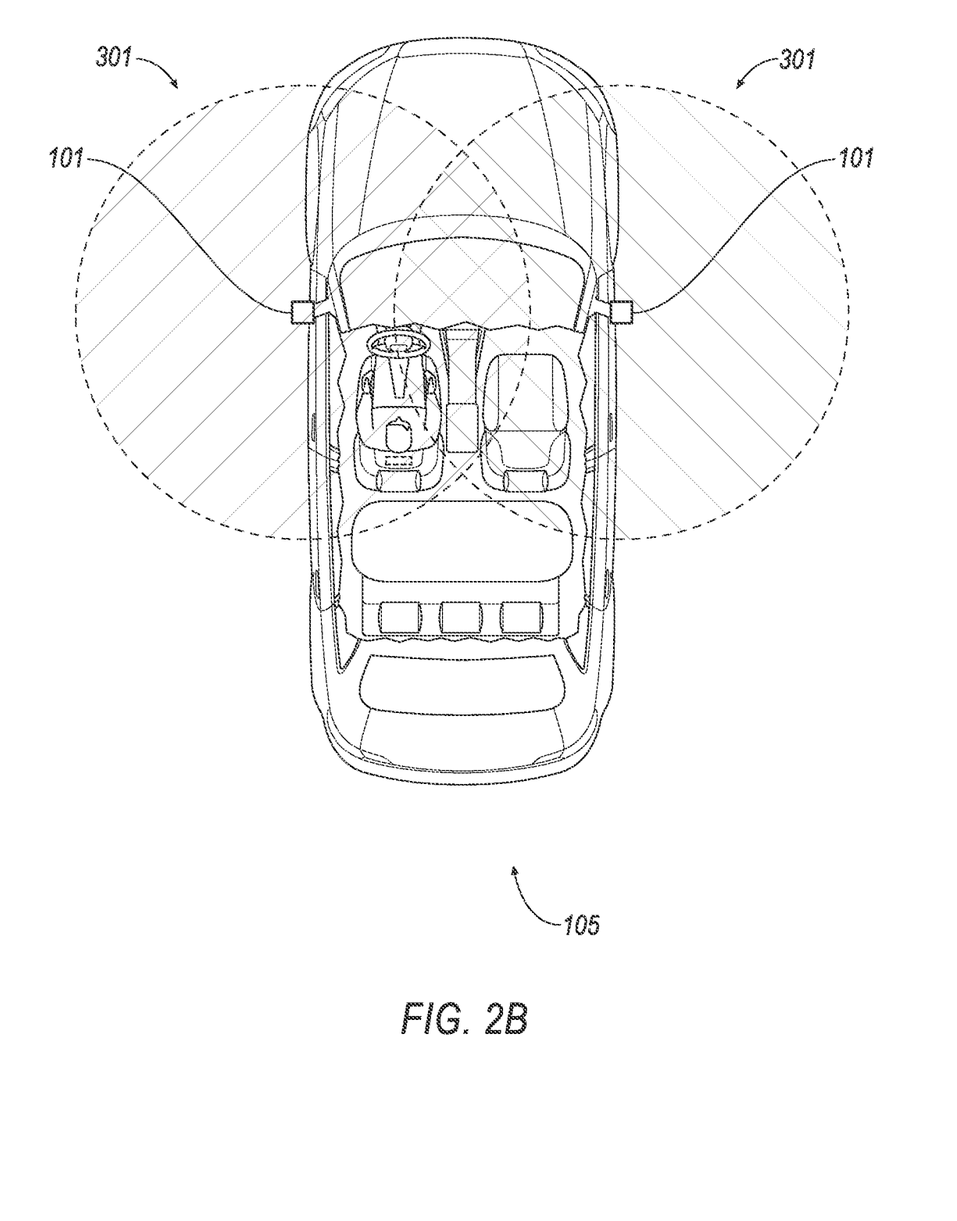
FIG. 2B is the top view of the vehicle of FIG. 1 with example LIDAR sensor fields of view superimposed thereon.

As seen in FIG. 2B, each LIDAR sensor 101 has a field of view 301. For example, FIG. 2B illustrates a LIDAR sensor 101a with a field of view 301a, as well as a LIDAR sensor 101b with a field of view 301b. Each of the fields of view 301a, 301b include respective first portions exterior to the vehicle 105, and respective second portions in the vehicle 105 interior 205. As illustrated in FIG. 2B, the different sensors 101 may generate different respective fields of view that may overlap, e.g., cover a same portion of a vehicle 105 interior 205. Typically, each of the fields of view 301a, 301b may have a detection range of 200 meters, i.e., a maximum distance away from each of the LIDAR sensor 101 in which, e.g., an object, may be detected by the respective LIDAR sensor 101. Alternatively, the detection range of LIDAR sensors 101 may be greater than or less than 200 meters.

Using LIDAR sensor 101 data from a field of view 301 the computing device 103 may provide a three dimensional (3D) model of some or all of a field of view 301, i.e., of objects therein. For example, a 3D model for an interior 205 portion of a field of view 301 could be generated, and could model an occupant 204. Such model could be used to identify occupant 204 characteristics including without limitation occupant 204 position, occupant 204 vision line-of-sight, an angle of occupant 204 torso relative to a horizontal plane, etc. Additionally, the computing device 103 may determine a number of occupants 204 in the vehicle interior 205, a state of a physical component in the vehicle 105, e.g., a vehicle seat 210 state, i.e. folded, rotated, upright, position on a longitudinal track, etc., a table state, i.e. retracted position and extended position.

The computing device 103 may use data from one or more LIDAR sensors 101 to provide information about an object such as an occupant 204. For example, the computing device 103 could determine a vehicle occupant state, e.g., absent, awake or sleeping, with data from each of two sensors 101. As discussed above the field of view 301a and 301b may overlap. If the occupant is in an area inside the vehicle 105 in which the fields of view 301a and 301b overlap, then both sensors 101 may provide data for the occupant. If the data for the occupant in the overlap area indicated same results, e.g., both sensors 101 provided data indicating that an occupant 204 was awake, then the computing device 103 could evaluate that the occupant 204 was in an "awake" state. However, if the results disagreed, the computing device 103 could determine that evaluating the occupant state of wakefulness was not possible. Further possible is that the computing device 103 could use data form a sensor 101 determined to have a highest degree of reliability, e.g., using techniques to determine a confidence level in LIDAR sensor 101 data.

Further, the computing device 103 could combine data from the LIDAR sensor(s) 101 and other vehicle 105 sensors, e.g., vision cameras, infrared cameras, etc., to determine an occupant state. For example, the computing device 103 could compare sensor data from LIDAR sensor (s) 101 and camera image data, and determine the vehicle occupant state. This or other data fusion techniques can reduce a likelihood of false determinations, and improve a confidence in determining the vehicle occupant state, e.g., absent, awake, sleeping.

In another example, the computing device 103 may combine data from LIDAR sensors 101 to generate a single 3D model, e.g., by stitching a 3D model generated from data from each of two fields of view 301a and 301b. This or other data fusion techniques may reduce a likelihood of false detections, and improve a confidence in detecting the vehicle occupant state and/or generating 3D model of the vehicle interior 205 or at least a portion thereof.

Additionally, the computing device 103 may be programmed to receive data from the LIDAR sensor(s) 101 mounted to the vehicle exterior, and generate a 3D map of vehicle 105 surrounding area encompassed by the vehicle exterior view portion 301. For example, the 3D map of vehicle 105 surrounding area may include data indicating distance, size, height of an object in the vehicle 105 surrounding area, e.g., other vehicles, road structures, pedestrians, etc. Additionally or alternatively, the 3D map of vehicle 105 may include occupant state of other vehicles in the vehicle 105 surrounding area, e.g., whether another vehicle proximate to the vehicle 105 has any occupant, identifying a number of occupants in the other vehicle, a state of each of the occupants of the other vehicle, etc.

Using data received from vehicle 105 sensors, e.g., radar, camera, or 3D map of vehicle 105 surrounding area generated based on LIDAR sensors 101 data, the computing device 103 may operate the vehicle 105 in an autonomous mode, i.e., making various determinations and/or controlling various vehicle 105 components and/or operations without a driver to operate the vehicle 105. The computing device 103 may include programming to regulate vehicle 105 operational behaviors such as speed, acceleration, deceleration, steering, etc., as well as tactical behaviors such as a distance between vehicles and/or amount of time between vehicles, lane-change minimum gap between vehicles, left-turnacross-path minimum, time-to-arrival at a particular location, intersection (without signal) minimum time-to-arrival to cross the intersection, etc.

A vehicle 105 may be operated in a semi-autonomous mode, i.e. some of vehicle 105 operations need driver monitoring, e.g., an adaptive cruise control ECU controls vehicle 105 speed and a human driver steers the vehicle 105.

Alternatively, the computing device 103 may operate the vehicle 105 in a non-autonomous mode, i.e., an occupant 204 monitors the vehicle 105 operation, e.g., setting the speed by applying pressure on a gas pedal, steering, or actuating a vehicle 105 brake. Therefore, the vehicle 105 operation in the non-autonomous mode does need readiness of the occupant 204, i.e. an occupant 204 should be in an expected state, e.g., a ready state as described above, and make determinations based on observing a surrounding area of the vehicle 105, e.g., recognizing lane markings of a driving lane and steer the vehicle 105 accordingly to keep the vehicle 105 in an intended driving lane.

An autonomous vehicle 105 may operate in the autonomous mode or may change to a non-autonomous mode of operation, for example, based on an input from the occupant 204, e.g., pushing a button. Alternatively or additionally, such a transition to the non-autonomous mode, may be initiated based on a determination of the computing device 103, e.g., due to detection of a failure of a vehicle 105 sensor, subsystem, etc. As stated above, operation of the vehicle 105 in the non-autonomous mode may need occupant 204 to be in an expected state, i.e., a state in which the occupant 204 can assume control of the vehicle. The computing device 103 may be programmed to determine whether the occupant 204 is needed to be in the expected state, and to determine whether the vehicle occupant 204 is in an expected state or an unexpected state. The computer 103 may further be programmed to, in response to the occupant 204 being in an unexpected state, i.e., a state in which the occupant 204 is unable to assume control of the vehicle, e.g., due to being distracted, in a position not facing vehicle controls, etc., perform an action to cause the vehicle occupant 204 state to change to the expected state, e.g., activating a haptic module 307 in a seat 210, turning on a buzzer, or rotating a seat 210 in the front row 303 toward direction of travel, if the computing device 103 determined that the seat 210 has been rotated in a direction away from the direction of travel.

The terms "first" and "second" in this disclosure are merely identifiers and are not intended to indicate order or importance.

Processes

Figure 5:
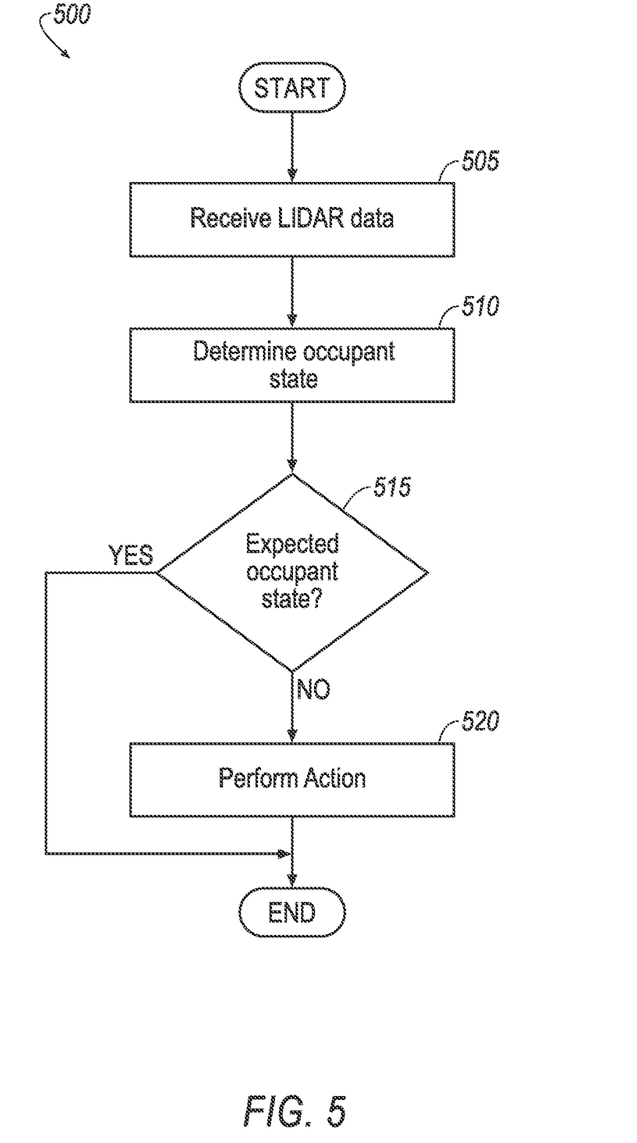
FIG. 5 is a flowchart of an exemplary process for determining a vehicle occupant state.

FIG. 5 illustrates a process 500 for determining a vehicle 105 occupant 204 state based on data received from LIDAR sensor(s) 101. The process 500 may be carried out according to instructions stored in a memory, and executed by a processor, of the computing device 103.

The process 500 begins with a block 505, in which the computing device 103 receives data from one or more LIDAR sensor(s) 101.

Next, in a block 510, the computing device 103 determines the vehicle occupant state based on the data received in the block 505. An occupant state can include one or more of a degree of wakefulness, a posture (e.g., facing a road, not facing a road, hands on wheel, hands not on wheel, etc.), etc. Known techniques for processing and interpreting LIDAR sensor 101 data may be used to determine an occupant 204 state. As discussed above, the computing device 103 may use data fusion techniques in the block 510 to combine the data received from the LIDAR sensor(s) 101 with the data received from other sensors, e.g., vision cameras.

As one example, the computing device 103 can generate a 3D model of an interior 205 portion of a field of view 301 based on the received data in the block 505. The computing device 103 may use data fusion, stitching or other techniques such as are known to generate the 3D model when the received data is from more than one LIDAR sensor 101. Then the computing device 103 may perform object detection based on the 3D model data such as is known to detect objects, human, buildings, etc.

Further, the computing device 103 may separate a portion of the generated 3D model associated with the interior 205 portion of field of view(s) 301, e.g., based on coordinates of the interior 205 relative to coordinates of a model generated from data from LIDAR sensors 101. As an example, the memory of the computing device 103 may include calibration parameters defining spatial borders of the vehicle interior 205 relative to a reference point of the 3D model. Using such stored calibration parameters, the computing device 103 may, for example, distinguish an occupant 204 in the vehicle interior 205 from a human sitting on a chair on a side of the road.

Further, the computing device may determine the detected occupant 204 state using gesture detection, posture detection, or other known techniques.

Additionally or alternatively, the computing device 103 may determine a number of occupants 204 in the vehicle 105 and/or positions of one or more occupants 204, e.g., in a driver's seat, a passenger seat, front seat, rear seat, etc. In this example, the computing device 103 may detect occupants 204, seats 210, and/or other objects in a generated 3D model of an interior portion 205. Further, the computing device 103 may determine a number of detected occupants 204. An importance of an occupant 204 state may be different depending on where the occupant 204 is located in the vehicle interior 205, e.g., a driver occupant 204 state versus a back seat 210 occupant 204 state. The computing device 103 may therefore determine an occupant 204 state at least in part according to an occupant 204 seat 210.

The computing device 103 may further use machine vision techniques to detect objects, human, etc., in a 3D model associated with an exterior portion of the vehicle 105, e.g., detecting pedestrians, vehicles, cycles, lane marking, traffic signs, etc. The computing device 103 or another ECU coupled to the computing device 103 may use the data indicating objects such as pedestrians, vehicles, etc., to operate the vehicle 105. For example, the computing device 103 may use a data indicating a distance of the vehicle 105 to an object to determine whether the vehicle 105 brake should be actuated.

Next, in a block 515, the computing device 103 determines whether the occupant 204 is in a predetermined expected state, e.g., in a designated driver seat 210, driver occupant 204 line of sight is toward a forward direction of the vehicle 105, and/or occupant 204 eyes are open.

If the occupant 204 is determined to be in the expected state, then the process 500 ends. Otherwise, the process 500 proceeds to a block 520.

In the block 520, the computing device 103 may perform an action based on a detected occupant 204 state. For example, the computing device 103 may actuate a haptic module 307 mounted in a seat 210, e.g., a seat 210 of a driver occupant 204. A vibration or movement generated by the haptic module 307 may cause that the occupant 204 state changes to the expected state. For example, changing from a drowsy state to the ready state.

Computing devices 103 such as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The terms "computer" and "computing device" are used interchangeably.

What is claimed is:

1. A system, comprising a controller including a processor and a memory, the memory storing instructions executable by the processor, including instructions to:
    receive data from a first LIDAR sensor mountable to a vehicle exterior with a field of view including a vehicle interior view first portion and a vehicle exterior view first portion; and
    determine a state of a vehicle occupant based at least in part on data from the first LIDAR sensor.

2. The system of claim 1, the instructions further including instructions to:
    receive data from a second LIDAR sensor mountable to the vehicle exterior with a second field of view including a vehicle interior view second portion and a vehicle exterior view second portion; and
    use the data from the second LIDAR sensor to determine a state of a second vehicle occupant.

3. The system of claim 1, the instructions further including instructions to generate a three dimensional model of the vehicle occupant.

4. The system of claim 1, wherein the processor is further programmed to determine a number of occupants in a vehicle interior.

5. The system of claim 1, the instructions further including instructions to:
    determine that the vehicle occupant is in an unexpected state; and
    perform an action to bring the vehicle occupant from the unexpected state to an expected state.

6. The system of claim 5, wherein the action includes actuating a haptic module.

7. The system of claim 1, wherein the processor is further programmed to use the data to create a three dimensional model of an area surrounding the vehicle exterior.

8. The system of claim 7, wherein the three dimensional model includes data indicating at least one of distance and size of an object in the area surrounding the vehicle exterior.

9. A method, comprising:
    receiving data from a first LIDAR sensor mounted to a vehicle exterior with a field of view including a vehicle interior view first portion and a vehicle exterior view first portion; and
    determining a state of a vehicle occupant based at least in part on data from the first LIDAR sensor.

10. The method of claim 9, further comprising:
    receiving data from a second LIDAR sensor mounted to the vehicle exterior with a second field of view including a vehicle interior view second portion and a vehicle exterior view second portion; and
    using the data from the second LIDAR sensor to determine a state of a second vehicle occupant.

11. The method of claim 9, further comprising generating a three dimensional model of the vehicle occupant.

12. The method of claim 9, further comprising:
    determining that the vehicle occupant is in an unexpected state; and
    performing an action to bring the vehicle occupant from the unexpected state to an expected state.

13. The method of claim 12, wherein the action includes actuating a haptic module.

14. The method of claim 9, further comprising using the data to create a three dimensional model of an area surrounding the vehicle exterior.

\* \* \* \* \*